Dec. 30, 1941.  C. W. VOGT  2,267,880
APPARATUS FOR FILLING AND SEALING CONTAINERS
Original Filed Feb. 27, 1936   4 Sheets-Sheet 1
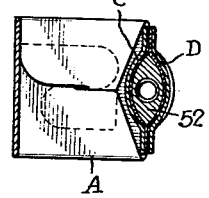
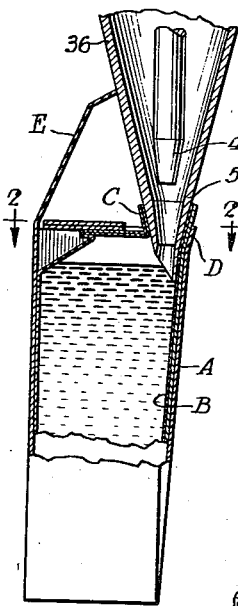
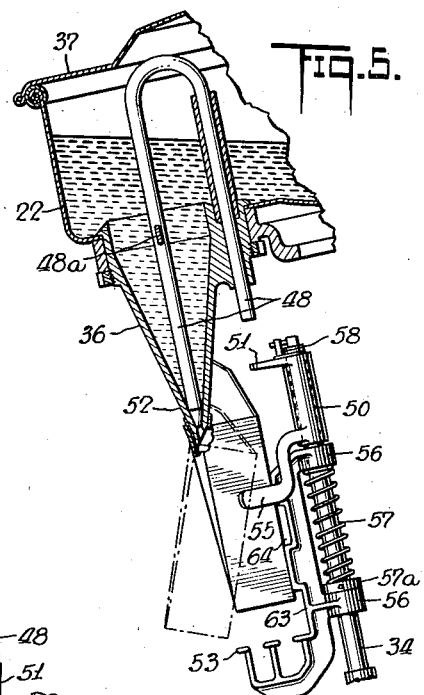
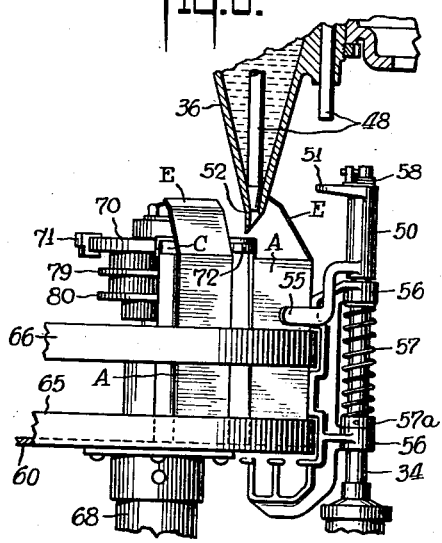
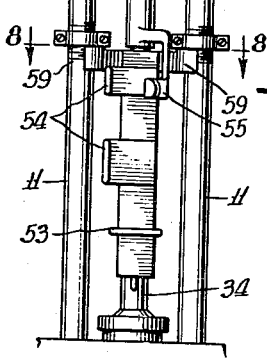
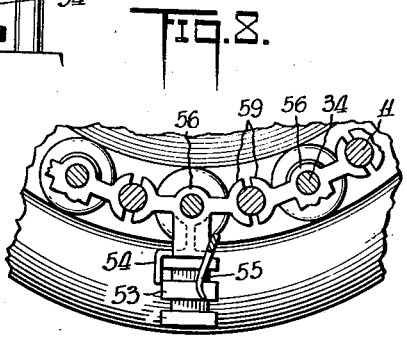
INVENTOR
Clarence W. Vogt
BY
Dean Fairbank & Hirsch
ATTORNEYS

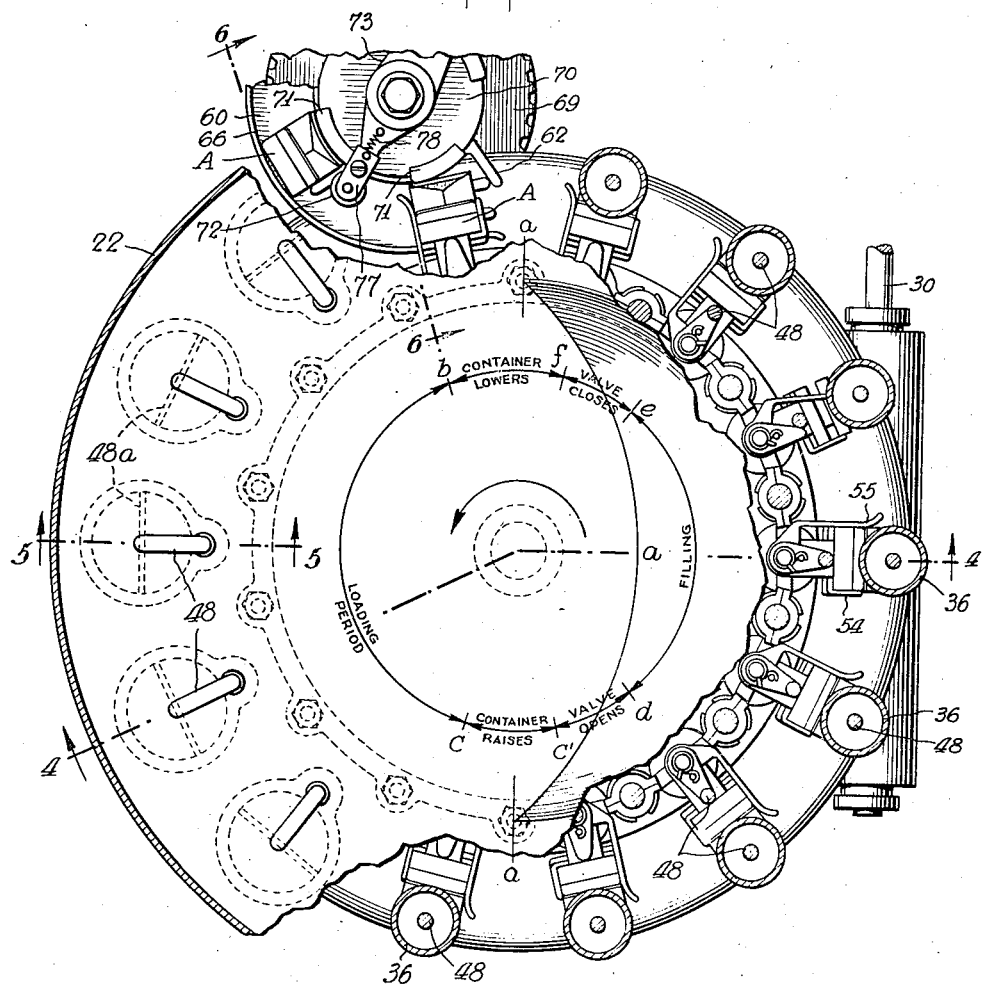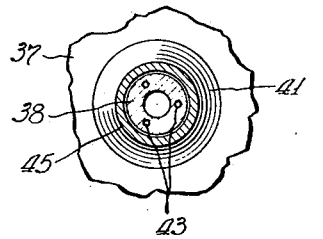

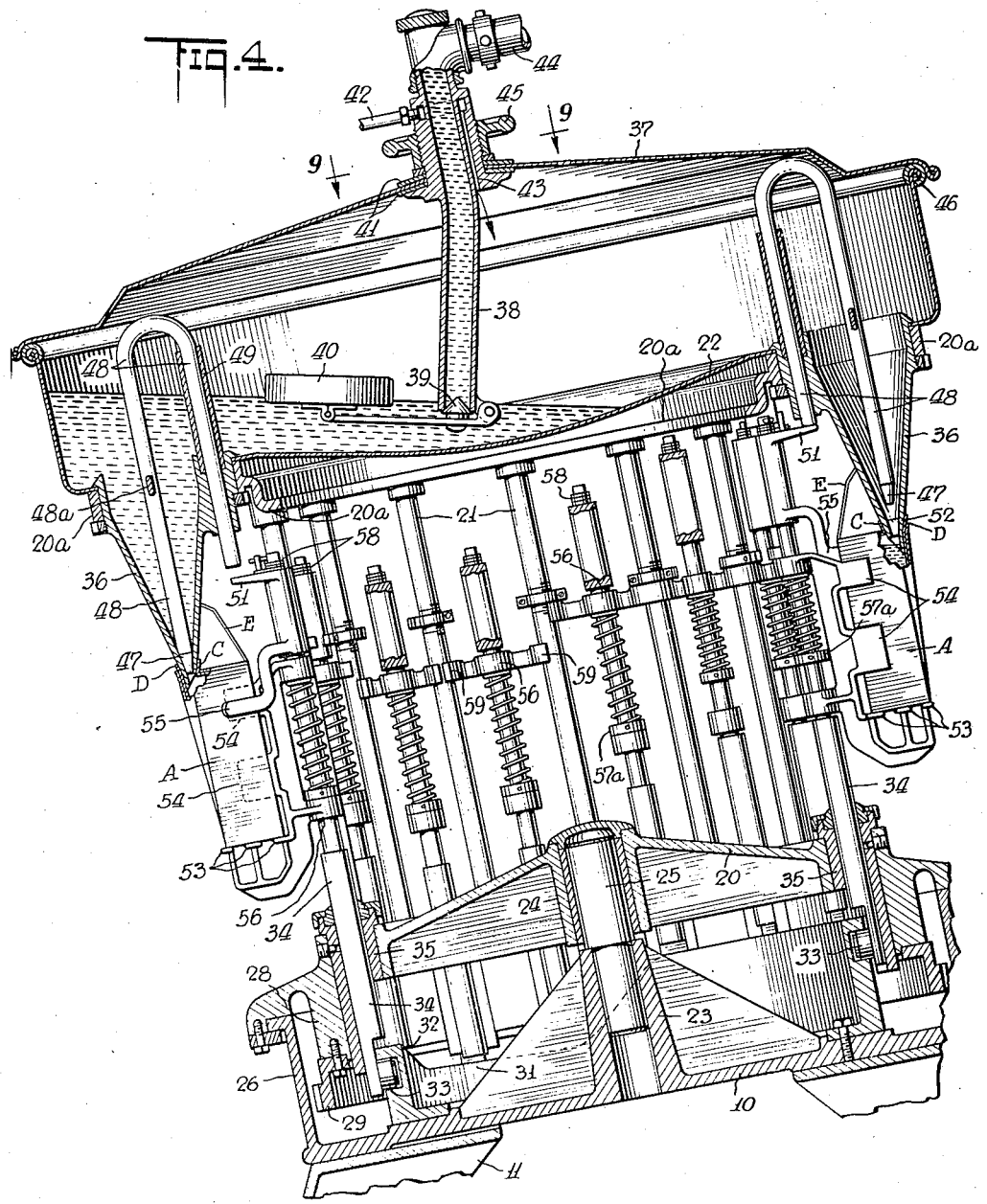

Dec. 30, 1941.     C. W. VOGT     2,267,880
APPARATUS FOR FILLING AND SEALING CONTAINERS
Original Filed Feb. 27, 1936     4 Sheets-Sheet 4
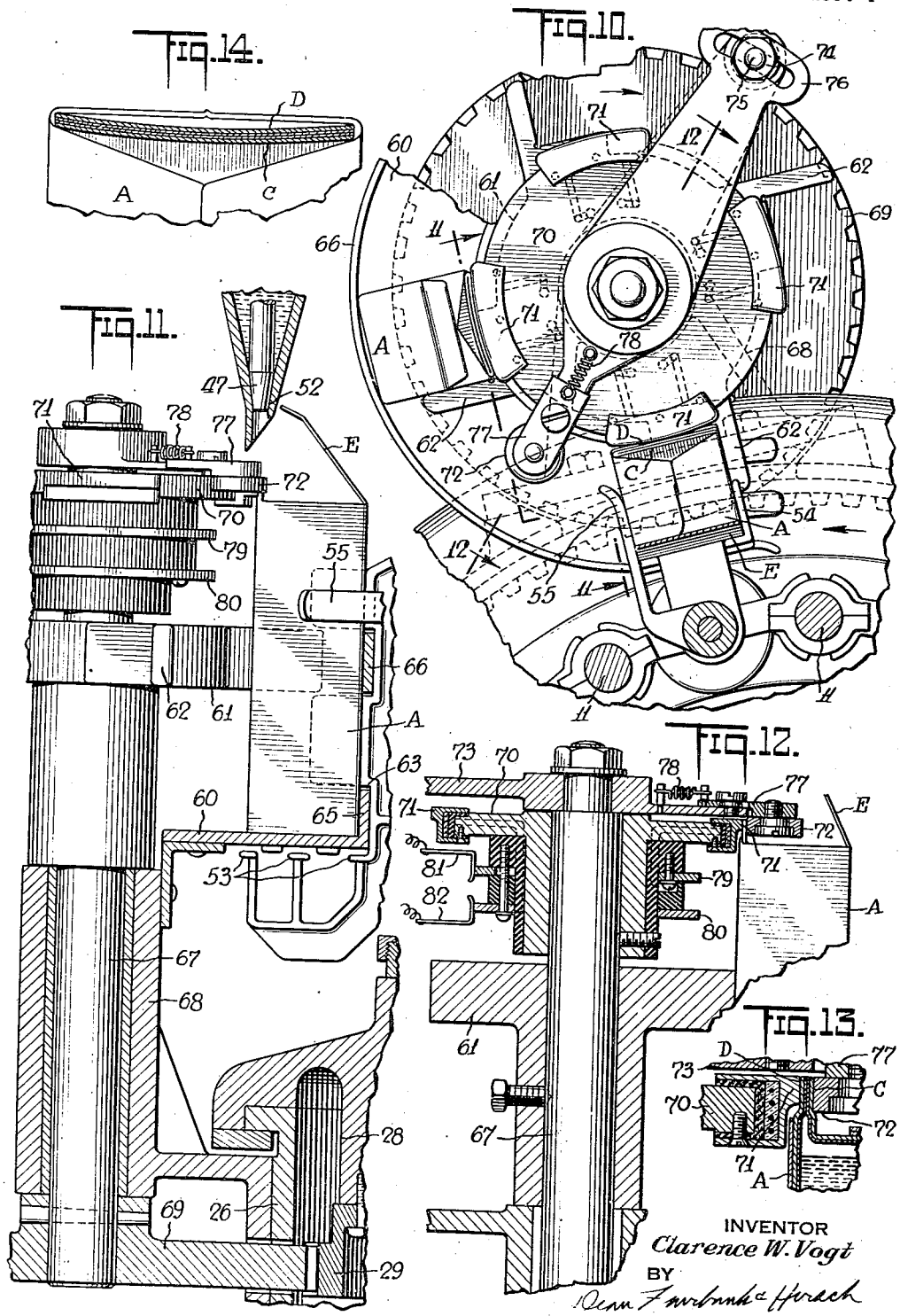
INVENTOR
*Clarence W. Vogt*
BY
ATTORNEYS Patented Dec. 30, 1941

2,267,880

UNITED STATES PATENT OFFICE 2,267,880

APPARATUS FOR FILLING AND SEALING CONTAINERS

Clarence W. Vogt, Norwalk, Conn.

Original application February 27, 1936, Serial No. 65,953. Divided and this application February 23, 1939, Serial No. 257,925

20 Claims. (Cl. 226—51)

This application is a division of my co-pending application on which was granted Patent No. 2,169,573 on August 15, 1939, and relates to a machine for filling and sealing containers, and more particularly to that type in which a series of containers after being filled are transferred to and passed in succession through a sealing apparatus.

In a preferred form, my improved apparatus is designed for use in connection with containers of a type, in which a predetermined or measured quantity of a liquid or other flowable material is delivered into a flat collapsed bag or other container, to expand and substantially fill the latter. The bag preferably has a pair of superposed wall sections, which may be bowed apart to form a filling opening, and which may be sealed together by heat and pressure after withdrawal of the filling nozzle. A container of that general type is disclosed and claimed in my Patent No. 2,171,717, issued September 5, 1939, in which the material to be packaged is retained in a thin flexible walled bag disposed in a carton. The bag there shown has a flap or pleat comprising a pair of plies or walls which are normally disposed in closely juxtaposed parallel positions, and which may be spread apart to form a filling opening therebetween. The bag is desirably lined or is made of impervious thermoplastic material such as "Pliofilm," capable of being heat sealed without the necessity of using adhesive or a separate closure member.

One object of the invention is to provide means for sealing together the walls defining the filling opening after the predetermined volume of material has been delivered, said sealing means being operated by and timed with the mechanism for effecting the measuring and discharging operations.

Another object of the invention is to provide means for sealing together the walls defining the opening of the container of the general type above referred to, while said container is in transit.

Another object is to provide means for sealing a series of containers of the general type referred to successively while in transit, and in time relationship with the filling mechanism.

As one feature of the present invention, the filling apparatus has a conveyor mechanism for the containers, and is provided with a delivery spout adapted to enter between the walls of the containers, and the sealing apparatus has a pair of members for pressing and sealing together the walls of the containers upon the removal of said delivery spout, said filling and sealing apparatus being operated in time relationship.

As another feature, the filling apparatus is of the rotary type, having a supply chamber and a nozzle for delivery of liquid to the container, said nozzle being adapted to enter between the walls of said container and spread them apart, and said sealing apparatus being also of the rotary type, and having a rotary conveyor for removing the containers from the filling apparatus, a heating element and a pressure element between which said walls pass upon the withdrawal of said nozzle for sealing operations.

Various other objects, features and advantages of the invention will be apparent from the following particular description, and from an inspection of the accompanying drawings, in which:

Fig. 1 is an enlarged vertical section, showing a container in filling position with respect to the measuring chamber, Fig. 2 is a transverse section taken on line 2—2 of Fig. 1, Fig. 3 is a top plan view of the combined filling and sealing apparatus, portions being broken away at different planes, Fig. 4 is a vertical section taken on line 4—4 of Fig. 3, Fig. 5 is a detail showing the position of the container as it is brought into registry with the measuring chamber, and taken on line 5—5 of Fig. 3, Fig. 6 is a detail taken on line 6—6 of Fig. 3, and showing the container and measuring chamber in another position, Fig. 7 is a face view of one of the container supports, Fig. 8 is a transverse section through a portion of the filling machine, said section being taken on line 8—8 of Fig. 7, Fig. 9 is a sectional detail taken on line 9—9 of Fig. 4, Fig. 10 is a top plan view of the sealing means shown at the upper side of Fig. 3, but on a larger scale, Figs. 11 and 12 are sections taken on lines 11—11 and 12—12 respectively of Fig. 10, Fig. 13 is a detail similar to a portion of Fig. 12, but on a larger scale showing the sealing parts, and Fig. 14 is a top plan view of the container with the walls of the flap or pleat sealed together, and shown in section.

In the construction of the filling apparatus illustrated, there is a base 10 provided with means whereby it may be adjustably tilted to a limited extent in respect to the horizontal, as shown in my Patent No. 2,169,573.

The base 10 serves to rotatably support the main frame of the machine, which includes a base frame member 20, an annular series of upwardly extending rods 21, and an upper supply tank 22. The base has a central upwardly facing socket 23, and the frame member 20 has a central downwardly facing socket 24 receiving an axle or pivot rod 25. The frame member 20 has a depending flange 28 within the casing 26, and provided with a worm wheel 29 which engages a worm on a transverse shaft 30 journaled in the wall 26 at one side thereof. Thus by rotating the shaft 30, the frame 20 and all parts carried thereby are rotated about the pivot 25 as a center. Within the casing there is also provided an annular cam flange 31 mounted on the base 20, and provided with a peripheral cam groove 32, in which travel rollers 33 secured to rods 34 vertically slidable in suitable bearings or guides 35 in the frame member 20.

The supply tank 22 is mounted on an upper frame member 20a which, in turn, is supported from and rigidly secured to the lower frame member 20 by the vertical rods 21. The tank is of light sheet metal and carries a series of depending measuring chambers 36, each of which is open at its upper end into the supply tank. The liquid level within the supply tank is such that due to the inclination of the axis 25, the measuring chambers will have their upper ends below the liquid level during a part of their path of movement around the axis, and will have their upper ends above said liquid level at another portion of the path of movement. Thus during the rotation, each measuring chamber will pass beneath the liquid, so that it will be filled and will then pass above the liquid level.

Any suitable means may be employed for maintaining this liquid level. As shown, the tank 22 is provided with a cover 37, and through the center of the latter extends a delivery pipe 38 having a float controlled valve 39 at the lower end thereof. The pipe is preferably held against rotation, so that the float 40 will remain on the downwardly inclined side of the center of rotation.

If it is desired to employ gas pressure for facilitating the rapid delivery of the liquid from the measuring chambers, the tank 22 may be gas tight. As shown, the pipe 38 has packing gaskets 41 engaging the upper and lower surfaces of the cover 37 to form a substantially gas tight seal, and the upper end of the pipe 38 is provided with a gas supply pipe 42 communicating with a passage 43 leading to the interior of the tank. The pipe may be held against rotation not only by the pipe 42, but by the liquid supply pipe 44 connected to and extending at right angles from the upper end of the pipe 38. Additional means may be employed for preventing rotation if desired, and the packing gaskets 41 may be adjusted by a collar 45 threaded on the portion of the pipe 38 above the cover. The peripheral edge of the cover may be sealed to the peripheral wall of the tank by a suitable gasket 46.

Preferably the measuring chambers are substantially conical with their largest end uppermost. This shape also facilitates the rapid discharge of the liquid from the measuring chamber, when the valve at the lower end of the chamber is opened.

For controlling the discharge of the liquid from the measuring chamber, a simple form of valve is a conical plug 47, vertically movable within the measuring chamber, and adapted to fit in a valve seat or in the lower end of the conical chamber. Such a valve plug may be connected to a rod 48 extending up into the tank 22 above the liquid level therein, and thence down through a guide tube 49 and the bottom of the tank. The rod 48 may be held in a central position in the chamber by a cross guide 48a extending at right angles to the plane of the rod and guide 49. A separate cam operated rod 34 is provided for each measuring chamber, and upon the upper end of each rod there is provided a sleeve 50 with a projection 51, which may be moved into or out of alignment with the end of the valve rod 48, so that when the rod is lifted, the projection 51 will engage the valve rod and lift the valve from its seat, so that the liquid may discharge through the lower end of the chamber, which by reason of the conical form constitutes a delivery spout or nozzle 52. Each of the vertically movable rods 34 serves not only for opening the valve, but also for supporting the container to be filled.

A container, which may be filled and sealed in my improved apparatus, includes a carton A having an inner lining of flexible slightly stretchable impervious sheet material B, which latter is so designed as to form a flap which may extend upwardly with two closely juxtaposed parallel walls C and D. The container may be filled by separating these two flaps and extending the nozzle end 52 between the two walls of the flap as shown particularly in Figs. 1 and 2. When the predetermined amount of liquid has been delivered into the container and the latter removed from the filling nozzle 52, the two walls of the flap will come together and may be folded down and retained in folded position by the cover flap E of the carton.

Each valve operating and receptacle carrying rod 34 is provided with a support 53 for the container, one or more side clamps or guides 54 and an opposed cam or guide 55. The guide 55 is connected to the sleeve 50 which carries the valve operating member 51. In placing the container into position to be filled, the filling opening of the container is telescoped onto the nozzle 52, and the clamp 55 is moved to one side and the container held between the clamps 54 and 55, and preferably spaced above the support 53 as shown in Fig. 5.

During the rotation of the apparatus, the cam groove at the proper time raises the rod 34 until the support 53 contacts with the bottom of the container and the valve operating member 51 raises the valve. Each container support 53 is provided with a collar 56, which is slidable upon the rod 34, and is normally held in an upper limiting position by a coil spring 57, the lower end of which bears against the upper surface of a collar 57a, which is fixed to shafts 34 by a pin or set screw. After the container support 53 has engaged the bottom of the container, and has moved it upwardly to the position shown in Fig. 1 where the upper rim of the nozzle is snugly socketed within the container opening, the further upward movement of the rod will result in compression of the spring, so that there will be no breaking, jamming or distortion of the container.

The sleeve 50 is rotatable to a limited extent on the upper end of the rod 34 and is normally held in a predetermined position by a torsion spring 58. If there is no container in place between the clamps 54 and 55 then the spring 58 will hold the sleeve 50 in such position that the valve operating member 51 is out of alignment with the valve rod 48 and the valve is not opened during the upward movement of the rod 34. The placing of a container between the clamps 54 and 55 automatically rotates the sleeve 50 to such a position that when the rod 34 comes up the valve will be opened.

The rods 21 which support the supply tank 22 also serve as guides for the upper ends of the rods 34. The upper collar 56 of the container support may be provided with lateral extensions 59 slidable along the opposite juxtaposed rods 21 as shown particularly in Fig. 4.

Although the containers are preferably placed in position by hand it will be evident that means might be provided for automatically delivering them to the rotating apparatus as each measuring chamber reaches a predetermined position in its path of movement. The filling apparatus above described involves important features claimed in my Patent No. 2,169,573. The present invention relates to the parts of the apparatus for separating the flaps for filling, and then sealing them together.

In the present invention, means are provided for removing the containers from the apparatus after they have been filled. As illustrated in Figs. 3 and 6, the container support for each filled container is lowered when the container reaches a predetermined position in the path of movement, and the valve closed. Due to the weight of the filled container, it will move downwardly with the container support and out of engagement with the delivery spout. Just beyond this point in the path of movement, there is provided a curved channel shaped guide 60 into which the containers enter, and along which they are moved to a limited extent by the clamp member 54 until they are disengaged from the latter due to the reverse curvature of the guide 60 and the path of movement of the container support. As the containers are disengaged from the container support, they are moved along the channel shaped guide 60 by suitable endless conveying means, such for instance as a wheel 61 having fingers 62 projecting into and movable along the guide 60. The reciprocating slide of the container support 53 may have a pair of recesses 63 and 64 into which the bars 65 and 66 forming the outer wall of the delivery guide 60 may enter, so as to insure the proper positioning of the container in the guide before the container leaves its support and clamping means.

The wheel 61 is mounted on a shaft 67 journaled in a bracket 68 carried by the wall 20 of the gear casing. The lower end of the shaft carries a gear 69 meshing with the main gear 29.

As the container is lowered and removed from the nozzle, its walls come together in parallel positions as shown in Fig. 14 with the flap remaining in an upstanding or substantially vertical position and approximately in the plane of the outer side walls of the container. The flap has two juxtaposed walls or plies C and D, which are laminated, the inner layer of each being of a heat sealing material, such as "Pliofilm," and the outer layer of each being of paper or the like.

For sealing these walls of the flap or pleat together, the shaft 67 above the wheel 61 is provided with a disc or head 70 having heated shoes, platens, plates, or contact members 71, each of a length and height approximately that of the flap to be sealed, and properly positioned in respect to the fingers 62 that they contact the outer surface of the outer wall D of the flap as the container is being carried along by the wheel.

At one point in the path of travel of the container is a member for engaging the surface of the other wall C, and pressing the walls together against the heated member 71. This is preferably in the form of a roller 72, which may be carried by an arm 73 journaled on the upper end of the shaft 67, and normally locked in proper position by a nut 74 on a stationary bolt 75 carried by the bracket 68, and extending through an arcuate slot 76 in the end of the arm 73. The roller 72 is not secured directly to the arm 73, but is mounted in a bracket or extension 77 movable endwise of the arm and pulled toward an inner limiting position by a spring 78. Thus as each container is carried along with the wall D of the flap in contact with the heated member 71, the flap when it reaches the roller 72 has its two walls pressed together and pressed against the heater by the roller and spring, and the two walls are sealed together to hermetically seal the container. The outer layer of each wall is not softened or melted by the heat and pressure, but the heat and pressure are transmitted through the outer layers to soften and seal the inner layers together and to the outer layers. The outer layers protect the inner layers from direct contact with the pressing and sealing members.

Any suitable means may be employed for heating the contact members 71. As shown, they are carried by but insulated from the disc 70, and each contains an electric heating element. The heating elements have their terminals connected to two collector rings 79, 80 which engage brushes 81, 82 connected to the source of electric current.

The cam groove 32 is of such shape as to effect the opening and closing of the valves at the proper points in the path of movement. The valves should close before the measuring chamber moves beneath the liquid level in the tank 22, and should open after the measuring chamber moves above said liquid level. The cam may be so formed as to close the valve with a dropping and slight jarring or even slight jamming action to insure tight closing and shaking off of the liquid in the nozzle below the valve. This eliminates the necessity for any dripping period in the cycle. Dripping might be prevented by a small teat or extension on the valve and loosely fitting the lower end of the nozzle to retain the liquid by capillary action. The empty containers are brought into position and the filled ones are delivered from the apparatus in the part of the path of movement in which the measuring chambers have their upper ends beneath the liquid level in the supply tank.

As an indication of the sequence of operations effected by means of the cam, there is shown in Fig. 4 a line $a$ indicating the maximum liquid level in the supply container. The empty containers are brought into position, while a measuring chamber moves through the arc represented by the line $b$—$c$, and are raised while in the arc $c$—$c'$. The valve opens in the arc $c$—$d$, and the containers are filled in the arc $d$—$e$. The valve is closed in the arc $e$—$f$, and the filled containers are lowered in the first part of the arc $f$—$b$ and discharged at the point $b$.

The container shown permits the filling to commence while the container is substantially in collapsed condition, but open sufficiently to admit the tapered filling spout. This serves to reduce the head space necessary in the container for settling foam which would be produced by a relatively rapid filling rate. As it reduces foaming, it permits more immediate hermetic sealing.

The particular machine above described is merely one embodiment of my invention, and many of the details thereof may be modified within comparatively wide limits without departing from the scope of my invention.

Having thus described my invention, what I claim as new and desire to secure by Letters Patent is:

1. A filling apparatus for containers having an inlet opening formed of a pair of flexible juxtaposed normally substantially parallel walls adapted to be directly sealed together, said filling apparatus being of the type including a conveyor frame having a supply chamber, a nozzle for delivering liquid to the container, and adapted to enter between said walls and spread them apart, the combination of a conveyer for removing said containers from said frame and having a heating element, and a pressure element, said elements being relatively movable toward and from each other and engaging opposite surfaces of said walls as they pass therebetween after the withdrawal of said nozzle, for pressing and sealing said walls together while the container is being advanced by said conveyor.

2. A filling machine for containers having a pair of flexible juxtaposed normally substantially parallel walls adapted to be separated to form an inlet opening, said filling machine being of the type having a nozzle adapted to deliver liquid between said walls to said container, the combination of a rotatable carrier having a heating element coaxial therewith for engaging with one of said walls, and a roller having a normally stationary axis for pressing the walls together against said heating element during the movement of the container on said carrier.

3. An apparatus for sealing containers of the type in which the filling opening is formed of a pair of normally substantially parallel walls, said sealing apparatus including a rotatable member for carrying said containers, and provided with a heating element coaxial therewith for engaging with one of said walls, a roller in the path of movement of the other wall, and means for yieldingly pressing said roller toward the path of movement of said heating element for pressing and sealing the walls together.

4. An apparatus for filling containers of the type in which the filling opening is formed of a pair of normally substantially parallel walls, said apparatus including a conveyer having a series of spaced container supports, a sealing apparatus including a conveyer having a series of spaced platen members, means for driving said conveyers in time relationship to bring said supports successively into registry with said platen members, means for transferring the filled containers successively from said supports to said second conveyor, and in a position to bring the walls to be sealed into lapping relationship with the successive platen members, and means along the path of movement of said series of platen members for pressing the walls of the containers together and against the registering platen member to seal said walls together.

5. A sealing apparatus for containers, of the type in which the filling opening is formed of a pair of normally substantially parallel walls, including a platen member, means for moving a container and said platen member together with its walls against said platen member, and a pressure member in the path of movement of said walls for pressing said walls against said platen member, as said container and said platen member reach a position opposite said pressure member one of said members being heated.

6. A sealing apparatus for containers, of the type in which the filling opening is formed of a pair of normally substantially parallel walls, including a platen member, means for moving said platen member, means for moving the container in unison with said member, with said container walls against said member, and a pressure roller member in the path of movement of said walls for pressing said walls against said platen member, as said container and said platen member reach a position opposite said pressure member, one of said members being heated.

7. A sealing apparatus for containers, of the type in which the filling opening is formed of a pair of normally substantially parallel walls, including a heated platen member, means for moving said platen member, means for moving a container with said platen member with said container walls against said platen, and a yieldably mounted pressure roller in the path of movement of said walls, for yieldably pressing said walls against said platen member as said container and said platen member reach a position opposite said pressure member.

8. A sealing apparatus for containers of the type in which the filling opening is formed of a pair of normally substantially parallel walls, including an endless conveyer, a plurality of spaced platens on said conveyer, for moving the containers with their walls against said plates, and a pressure roller fixed against substantial movement in the direction of movement of the platens, and adapted to press against said platens as they successively pass said roller.

9. A sealing apparatus for containers of the type in which the filling opening is formed of a pair of normally substantially parallel walls, including a rotary conveyer, a plurality of spaced platens on said conveyer, and a roller fixed against body rotation with respect to said rotary conveyer, but mounted for yieldable movement in a radial direction with respect to said conveyer, said pressure roller being adapted to press against said platens as said platens successively pass said roller.

10. An apparatus for sealing the mouth of a filled flexible-walled container, including a platen member, means for moving said platen member, means for moving the filled container transversely in unison with said platen member with said mouth against said member, and a pressure member for pressing said mouth against said platen member as said platen member reaches a position opposite said pressure member, one of said members being heated.

11. An apparatus for sealing the mouth of a filled flexible-walled container, including a platen member, means for moving said platen member, means for moving the filled container transversely in unison with said platen member with said mouth against said member, and a pressure member for pressing said mouth against said platen member as said platen member reaches a position opposite said pressure member, one of said members being heated, and one of said members being yieldably mounted in a direction transversely of the plane of the mouth in sealing position.

12. An apparatus for sealing the mouth of filled flexible-walled containers, including a conveyor for carrying said containers transversely in upright position, and provided with a platen member for engaging one side of said mouth, a roller member in the path of movement of the other side of said mouth, one of said members being heated, and means for yieldably pressing said members relatively towards each other for pressing and sealing the opposite container walls of said mouth together.

13. An apparatus for sealing the mouth of filled flexible-walled containers, including a conveyer for carrying said containers transversely in upright position, and provided with a series of platen members each for engaging one side of the mouth of a container, a pressure member in the path of movement of the other side of said mouth, and means yieldably pressing said members relatively towards each other for sealing the opposite walls of said mouth together.

14. An apparatus for sealing the mouth of a filled flexible-walled container, including a rotatable member having supports for a series of said containers and a corresponding series of platen members, means for feeding said containers to said rotatable member at one point and a pressure member at another point in the path of movement of said containers for pressing together the walls of each container in succession, and pressing them against the registering platen member as said walls pass beneath said pressure member.

15. An apparatus for sealing the mouth of a filled flexible-walled container, including a rotatable member having supports for a series of said containers and a corresponding series of heated platen members, means for feeding said containers to said rotatable member at one point and a pressure member at another point in the path of movement of said containers for pressing together the walls of each container in succession, and pressing them against the registering platen member as said walls pass beneath said pressure member.

16. An apparatus for sealing the mouth of a filled flexible-walled container having substantially parallel mouth forming walls, including means for moving a series of said containers along a predetermined path, a series of platen members movable along a substantially parallel path, each platen member being adjacent to one surface of said walls, and a pressure member for pressing the walls of said mouth together and against the corresponding platen member as said walls pass beneath said pressure member.

17. An apparatus for sealing the mouth of a filled flexible-walled container having substantially parallel mouth forming walls, including means for moving a series of said containers along a predetermined path, a series of platen members movable along a substantially parallel path, each platen member being adjacent to one surface of said walls, and a rotatable pressure member for pressing the walls of said mouth together and against the corresponding platen member as said walls pass beneath said pressure member.

18. An apparatus for sealing the mouth of a filled flexible-walled container having substantially parallel walls defining said mouth, including a traveling platen member, means for supporting the filled containers and causing them to travel with the platen member with said walls adjacent to said platen member, and a pressure member having a stationary mounting and positioned to press said walls together and against said platen member along a line spaced below the free edges of said walls.

19. An apparatus for sealing the mouth of a filled flexible-walled container having substantially parallel walls defining said mouth, including a traveling heated platen member, means for supporting the filled containers and causing them to travel with the platen member with said walls adjacent to said platen member, and a rotatable pressure member having a stationary mounting and positioned to press said walls together and against said platen member along a line spaced below the free edges of said walls.

20. An apparatus for filling containers of the type in which the filling opening is formed of a pair of normally substantially parallel walls, said apparatus including an endless series of spaced container supports, a sealing apparatus including a platen member for engaging the surface of one of said walls and a pressure member cooperating therewith for engaging the surface of the other said wall, means for heating one of said members, an endless conveyor, one of said members being carried on said endless conveyor, and means including a finger on said endless conveyor for removing containers from said supports and operatively positioning the containers relative to the sealing member on said conveyor, said finger being positioned and arranged to move the containers with the conveyor and bring their said walls between said members for sealing operations.

CLARENCE W. VOGT.